(12) United States Patent
Dvorak

(10) Patent No.: US 7,416,040 B2
(45) Date of Patent: Aug. 26, 2008

(54) TRAVELLING DEVICE PARTICULARLY FOR SELF-PROPELLED MOWER

(76) Inventor: Lubomir Dvorak, Dvorce 62, 580 01 Havlickuv Brod (CZ)

( * ) Notice: Subject to any disclaimer, the term of this patent is extended or adjusted under 35 U.S.C. 154(b) by 483 days.

(21) Appl. No.: 10/523,451

(22) PCT Filed: Aug. 11, 2003

(86) PCT No.: PCT/CZ03/00045

§ 371 (c)(1),
(2), (4) Date: Sep. 9, 2005

(87) PCT Pub. No.: WO2004/014119

PCT Pub. Date: Feb. 19, 2004

(65) Prior Publication Data

US 2006/0102410 A1    May 18, 2006

(30) Foreign Application Priority Data

Aug. 13, 2002   (CZ) .................... PV 2002-2755

(51) Int. Cl.
*A01D 57/12*    (2006.01)
(52) U.S. Cl. .................. 180/167; 56/16.7; 56/12.7; 56/13.6; 56/14.5; 56/17.6; 56/255; 56/289; 56/297; 56/DIG. 17
(58) Field of Classification Search ............... 56/16.7, 56/12.7, 13.6, 14.5, 17.6, 255, 289, 295, 56/DIG. 17
See application file for complete search history.

(56) References Cited

U.S. PATENT DOCUMENTS

| | | | |
|---|---|---|---|
| 2,698,507 A | | 1/1955 | Siebring |
| 3,203,500 A | * | 8/1965 | Gaberson et al. ............ 180/168 |
| 3,839,610 A | * | 10/1974 | Harlow ........................ 280/92 |
| 4,041,678 A | * | 8/1977 | Chaney et al. ............... 56/10.7 |
| 4,318,266 A | | 3/1982 | Taube |
| 4,964,265 A | * | 10/1990 | Young ........................ 56/10.8 |
| 5,090,185 A | * | 2/1992 | Meeks ........................ 56/16.7 |
| 5,323,593 A | * | 6/1994 | Cline et al. ............... 56/10.2 A |
| 5,667,032 A | | 9/1997 | Kamlukin |
| 5,974,347 A | * | 10/1999 | Nelson ........................ 701/22 |
| 6,029,431 A | | 2/2000 | Dowler et al. |

FOREIGN PATENT DOCUMENTS

DE    43 03 342 A1    8/1994

* cited by examiner

*Primary Examiner*—Christopher Ellis
*Assistant Examiner*—Jacob Meyer
(74) *Attorney, Agent, or Firm*—Ladas and Parry LLP

(57) ABSTRACT

Travelling device (20) particularly for self-propelled mower comprises a frame (1) provided with several identical travelling units (21) arranged on its circumference. Each travelling unit (21) comprises a flexibly suspended travelling wheel 92) rotating on its horizontal and vertical axes. A motor unit (3) with a driving shaft (13) is arranged on said frame (1) for driving a working device and said travelling wheels (2). Said travelling wheels (2) are arranged in said travelling units (21) turnably on vertical axis in an unlimited angular range of 360°.

11 Claims, 3 Drawing Sheets

TRAVELLING DEVICE PARTICULARLY FOR SELF-PROPELLED MOWER

TECHNICAL FIELD OF THE INVENTION

The present invention relates to a travelling device particularly for self-propelled mower designed for working the terrain surfaces, said travelling device comprises a frame provided with several identical traveling units arranged on its circumference, each travelling unit comprises a flexibly suspended travelling wheel rotating on its horizontal and vertical axes, wherein a motor unit with a driving shaft is arranged on said frame for driving a working device and said travelling wheels.

BACKGROUND ART OF THE INVENTION

In the patent document U.S. Pat. No. 2,698,507 there is disclosed a drum mower provided with knives arranged into a helix, wherein a manual drive previously used is replaced by an electric motor with remote-controlled switch, built into a cable with four manually controlled switches. Rotation of said drum is transmitted from a travelling wheel.

Furthermore in the patent document U.S. Pat. No. 4,318,266 there is disclosed a remote-controlled self-propelled mower driven by a motor unit so that an operator can control it with a radio transmitter by means of radio signals transmitted from an antenna.

A receiver is arranged on the servomotors of the controlled mower. Driving of these servomotors controls microswitches and relay arranged on the electric motors, which are mechanically coupled with the travelling driving wheels and with a main shaft of a driving motor unit. Said electric motors control a speed of the mower travelling both forward and back on the commands of the operator. A remote control of throttle valve of carburetter can be used to control the motor unit revolutions.

In the patent document U.S. Pat. No. 4,964,265 there is also disclosed a remote-controlled self-propelled mower driven by electric motors fed from the storage battery.

The rear travelling wheels are driven. Said wheels are attached to the support frame. Steering of the travelling direction is provided by means of a set of belts and pulleys assigned to the front steerable wheels. An electric motor driven by a storage battery provides rotation of a central pulley, which controls the position of the front steerable wheels in relation to the frame.

Direction and speed of the mower is controlled by means of two radio channels. The travelling wheels are provided with hubs having a shape of truncated cone, which hubs allows movement on uneven terrain. The height of cutting is provided by adjustment of the vertical position of the travelling wheels.

In the utility model CZ 10 299 there is disclosed a travelling arrangement of grass mower. An electric motor is mechanically coupled with an alternator, which is through a storage battery connected to an actuator arranged within operator's grasp. Said actuator is further connected with reversing electric motors in reduction gears of front and back axles. One or both driving axles are steerable.

In the utility model CZ 9 634 there is disclosed a travelling arrangement of grass mower. A machine motor is mechanically coupled with a regulating hydraulic generator, which is coupled through piping and hydraulic oil tank with a hydraulic motor of rear driving axel. Said regulating hydraulic generator is by means of draw rod connected to an actuator arranged within operator's grasp.

At the present time there are known also self-propelled grass mowers with mowing device arranged between axles and provided with a channel for transport of harvested grass, which channel is arranged between the rear wheels, wherein said device is further provided with a grass container arranged behind the rear axle.

Transmission of the torsional moment from the motor pulley through variator to the mowing device is provided by an angular belt, which is in a complex fashion guided over guiding and tightening pulleys.

In the utility model CZ 10 763 there is disclosed an arrangement of hydrostatic drive for mowing device of a grass mower. A machine motor is mechanically coupled with a regulation hydraulic generator, which is connected through piping and hydraulic oil tank with a hydraulic motor of the mower. Said regulating hydraulic generator is by means of draw rod connected to an actuator arranged within operator's grasp.

Known are also machines and apparatuses for cutting and treating land areas, in particular slopes of the roadsides. These machines are based on the principle of hammer and pin rotors suspended on three-point support of the tractor or on the cantilever beam of the tractor. However, their operational area as well as their accessibility is substantially restricted, particularly on the slopes.

The above mentioned arrangements of mowers suffer from the common disadvantages consisting in non-uniform engagement and great wear of angled belts. All the known systems for transmission of the torsional moment from the motor to the mower are too difficult to produce, and therefore they are too expensive.

Furthermore, the known travelling devices have not the sufficient manoeuvrability in operation. In the course of their turning the centre of gravity is changed, so that the overturn can take place, in particular on the slopes.

It is an object of the present invention to eliminate the above mentioned drawbacks and to provide improved operation of the travelling device particularly for self-propelled mower.

SUMMARY OF THE INVENTION

In accordance with the present invention there is provided a travelling device particularly for self-propelled mower, said travelling device comprises a frame provided with several identical travelling units arranged on its circumference, each travelling unit comprises a flexibly suspended travelling wheel rotating on its horizontal and vertical axes, wherein a motor unit with a driving shaft is arranged on said frame for driving a working device and said travelling wheels, wherein said travelling wheels are arranged in said travelling units turnably on vertical axis in an unlimited angular range of 360°.

Each travelling unit advantageously further comprises a transmission disc for travelling wheel drive connected with said travelling wheel by means of a transmission device, and a transmission disc for travelling wheel turning, wherein all transmission discs for travelling wheel drive are connected with a moving off device, arranged on said driving shaft, by means of transmission members for travelling wheel drive, and all transmission discs for travelling wheel turning are girded by a transmission member for travelling wheels turning guided over a driving roller.

Each transmission disc for travelling wheel drive is advantageously positioned horizontally and is turnable on its vertical axis.

Each transmission disc for travelling wheel turning is conveniently positioned horizontally and is turnable on its vertical axis.

Said transmission member for travelling wheel drive advantageously comprises an endless flexible member.

Said transmission member for travelling wheel turning conveniently comprises an endless flexible member.

Said transmission member for travelling wheel turning advantageously comprises gears.

Said transmission member for travelling wheel turning can conveniently comprise Cardan shafts.

Auxiliary guide rollers for guiding transmission member for travelling wheels urning are advantageously further arranged on said frame.

A control unit interconnected with driving servomotor and steering servomotor for travelling wheels turning is conveniently further arranged on said frame.

Said control unit is advantageously remote-controlled.

Advantageously, said control unit is remote-controlled by means of transmitter for transmitting radio signals or optical signals.

A seat and a control panel can be arranged on said frame.

Advantageously, said travelling units are particularly four.

DETAILED DESCRIPTION OF THE PREFERRED EMBODIMENTS

Figure 1:
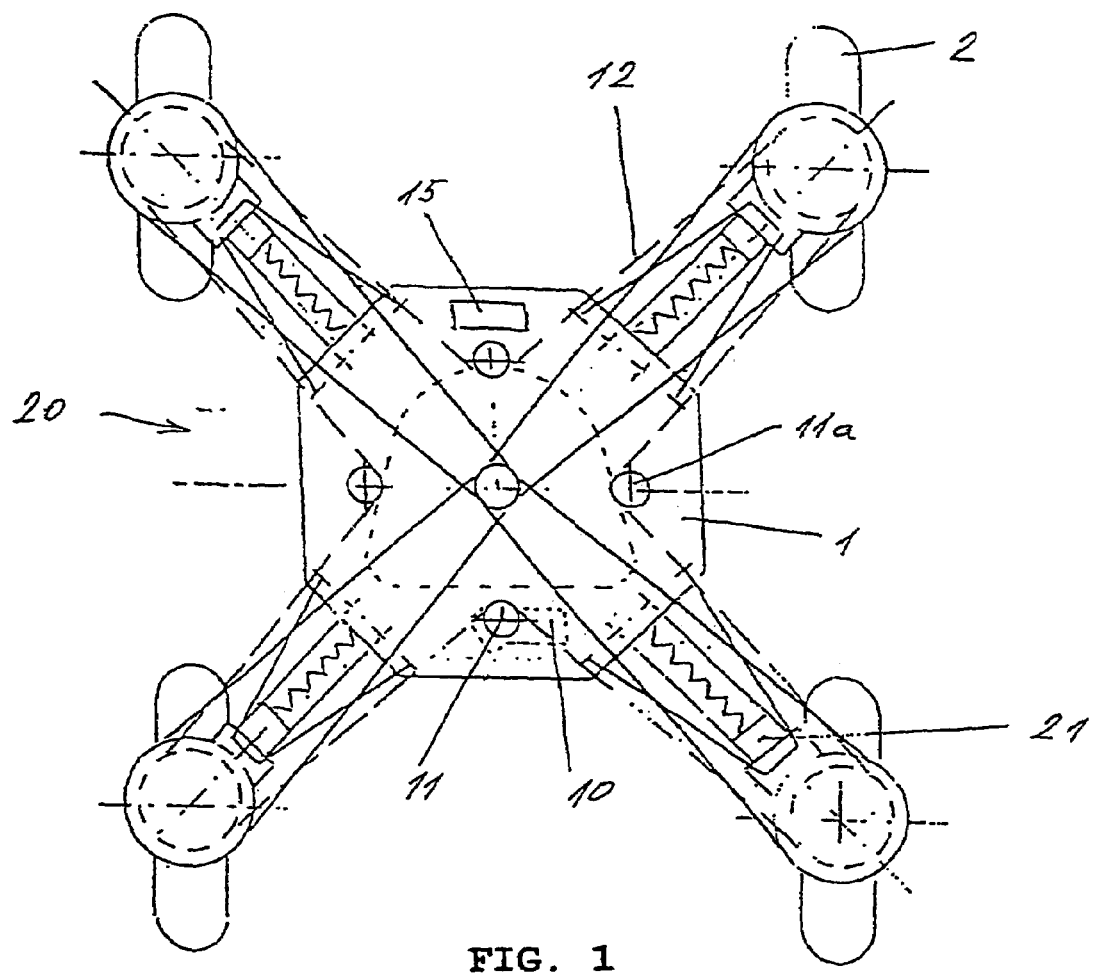
FIG. 1 is a top view of a preferred embodiment of the travelling device.
Figure 2:
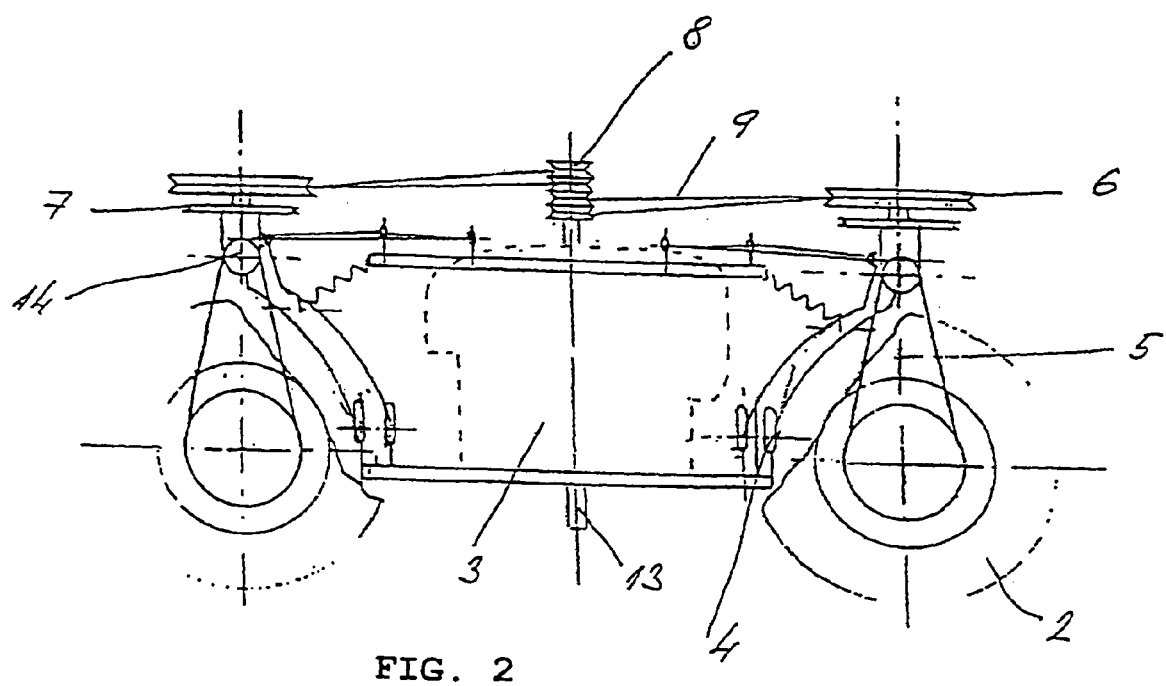
FIG. 2 is a section view of the travelling device of FIG. 1.

Referring now to FIGS. 1 and 2, there is illustrated a preferred embodiment of the present travelling device 20 comprising a frame on which a motor unit 3 is arranged. Driving shaft 13 on said motor unit 3 is positioned, for example, vertically. One end of this driving shaft 13 is designed for connecting a working device, for example, rotary mower, cultivation device, etc. The second end of said driving shaft 13 is provided with a moving off device 8, for example, driving pulleys, etc.

Moving off of said moving off device 20 is provided, for example, by a centrifugal clutch, which connects said driving shaft 13 with the respective transmission for driving said travelling wheels 2 depending on motor unit 3 speed.

Four travelling units 21, which can have individually adjustable height, are flexibly arranged on said frame 1 in a swinging manner. Each travelling unit 21 comprises a travelling wheel 2 turnably mounted in a device 5 for travelling wheel 2 mounting, which can be, for example, forked frame, so that said travelling wheel 2 can rotate on its horizontal axis. Travelling wheel 2 mounted in this manner is suspended on the frame 1 by means of a device 4 for travelling wheel 2 suspension, which can be, for example, leaf springs.

Each travelling wheel 2 is also turnable on its vertical axis, and especially in an unlimited angular range of 360°. Each travelling unit 21 is provided with a transmission disc 6 for travelling wheel 2 drive and with a transmission disc 7 for travelling wheel 2 turning. These transmission discs 6 and 7 are arranged horizontally on vertical shafts of said travelling wheel 2. Transmission discs 6 and 7 can comprise, for example, belt pulleys, chain pulleys, rollers, gears, etc.

Each transmission disc 6 for travelling wheel 2 drive is connected with said travelling wheel 2 by means of a transmission device 14. Each transmission disc 6 for travelling wheel 2 drive is further connected by means of an endless transmission member 9 for travelling wheel 2 drive with a moving off device 8 arranged on a driving shaft 13 of the motor unit 3.

Each transmission disc 6 for travelling wheel 2 drive or directly said travelling wheel 2 can be also connected with the moving off device 8 on the driving shaft 13 by means of another suitable transmission, such as mechanical, electric, electromagnetic or hydraulic transmission, as e.g. change gearbox, Cardan shaft, hydraulic system, etc.

All transmission discs 7 for travelling wheel 2 turning are girded with an endless transmission member 12 for travelling wheels 2 turning, guided over a driving roller 11, and possibly over the further auxiliary guide rollers 11a arranged on the frame 1.

Each transmission disc 7 for travelling wheel 2 turning or directly the vertical shaft of travelling wheels 2 can be alternatively connected with the driving roller 11 or directly with the steering servomotor 10 for travelling wheels 2 turning by means of another suitable transmission, such as mechanical, electric, electromagnetic or hydraulic transmission, as e.g. change gearbox, Cardan shaft, hydraulic system, etc.

Endless transmission members 9 and 12 can comprise e.g. belts, chains, ropes, cables, indented belts, etc.

On the frame 1 of the travelling device 20 there is further arranged a control unit 22 as weell as a driving servomotor 15 and a steering servomotor 10 for travelling wheels turning, which servomotors 15 and 10 are connected with said control unit 22. These servomotors 15 and 10 can comprise e.g. stepping motors.

Said steering servomotor 10 and said driving servomotor 15 can be alternatively replaced by another suitable driving devices, such as hydraulic motors, electric motors with appropriate mechanical, electric, electromagnetic or hydraulic coupling for travelling wheels 2 steering and driving.

The driving roller 11 is connected with the steering servomotor 10 for travelling wheels 2 turning. Said driving roller 11 by means of the endless transmission member 12 for travelling wheels 2 turning provides rotation of the transmission discs 7 for travelling wheel 2 turning so that the turning of all travelling wheels 2 can be controlled simultaneously.

The steering servomotor 10 for travelling wheels 2 turning can be alternatively replaced by another suitable driving device connected by means of suitable coupling, e.g. mechanical, electric, electromagnetic or hydraulic coupling with the driving roller 11 or directly with the vertical shaft of the travelling wheels 2. By means of said coupling the travelling wheels 2 turning can be provided. All travelling wheels 2 can be turned simultaneously. Alternatively, each of the travelling wheel 2 can be turned also individually.

Figure 3:
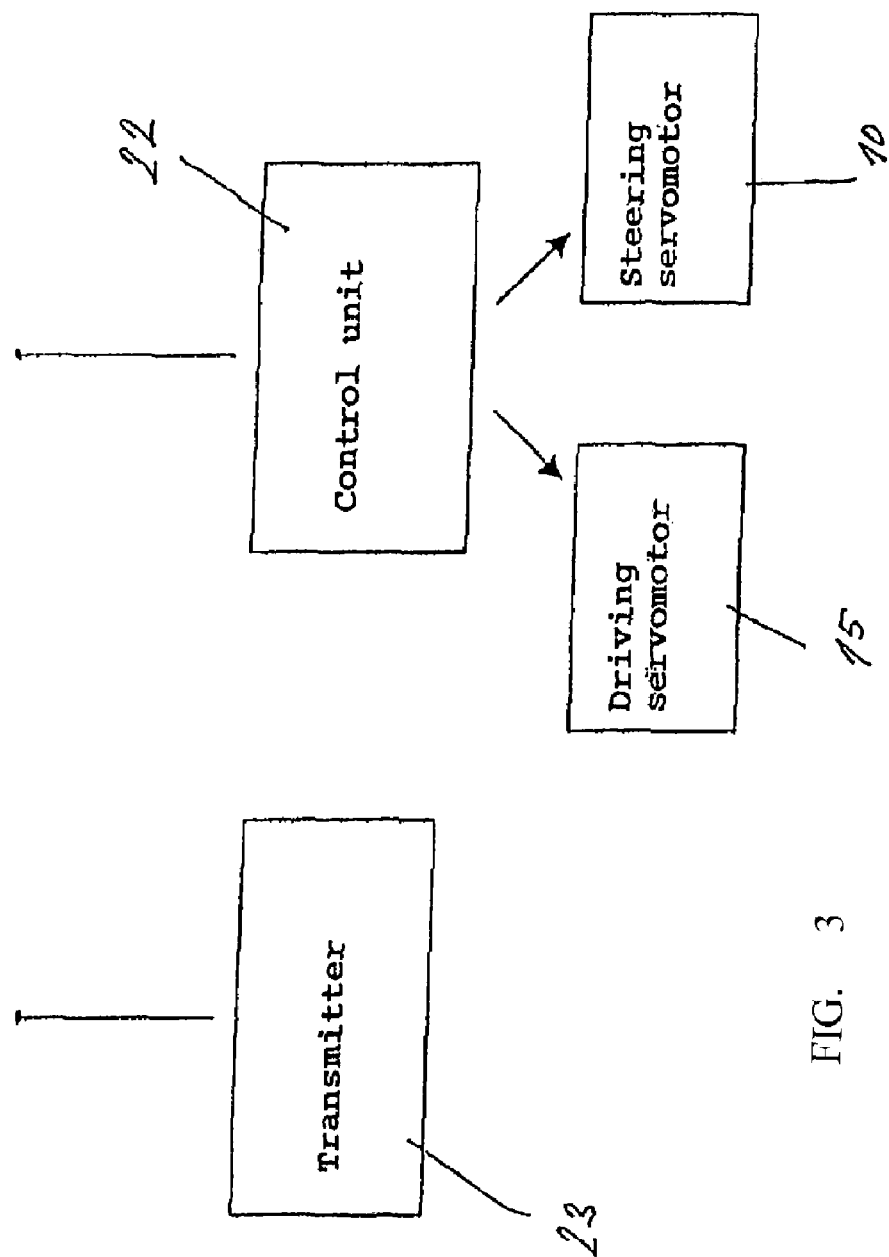
FIG. 3 is a schematic diagram of a remote control in accordance with another embodiment.

Conveniently, the control unit 22 can be provided with remote control so that the whole operation of the present travelling device 20 can be remote-controlled by means of a transmitter 23 (see FIG. 3).

Accordingly, the operational principle of the above described preferred embodiment consists particularly in the fact that driving of all travelling wheels 2 is provided simultaneously by means of transmission of a torsional moment from the driving shaft 13 of the motor unit 3 through the moving off device 8 by means of the endless transmission members 9 for travelling wheel 2 drive to the transmission discs 6 for travelling wheel 2 drive, and from here through the rectangular transmission devices 14 to the travelling wheels 2.

Control of the travelling device 20 movement direction including reverse running is provided in such manner that the steering servomotor 10 for travelling wheels 2 turning controls the driving roller 11, and from here the torsional moment is transmitted by means of the endless transmission member 12 for travelling wheels 2 turning to the transmission discs 7 for travelling 2 turning connected with the travelling wheels 2. Consequently, all travelling wheels 2 are rotated simultaneously on their vertical axes in an unlimited angular range of 360°.

Conveniently, the operation of the travelling device 20 according to the present invention is remote-controlled by means of the transmitter 23. Said transmitter 23 controls the control unit 22 which further controls the servomotors 10 and 15 (see FIG. 3).

By means of said transmitter 23 it is possible to control, for example, starting, switching and breaking of the motor unit 3, and to control its number of revolutions. Similarly it is possible to control switching on and off of the working device, as well as travelling of the present machine and turning of the travelling wheels 2.

If the remote control is not used, then the frame 1 can be provided with a seat and a control panel for an operator (not shown).

The travelling device 20 according to the present invention provides a plurality of advantages in comparison with the prior art devices.

With the travelling device 20 according to the present invention it is possible to control the direction of its movement very easily by means of simultaneous turning of all travelling wheels 2 on their vertical axes by means of the steering servomotor 10 for travelling wheels 2 turning. Therefore, no differential gear is needed.

By turning of the travelling wheels 2 the present travelling device 20 can move to the right and to the left, wherein by turning of the travelling wheels 2 by 180° the return running can be achieved without reverse gear shifting.

No change of the centre of gravity takes place in the course of turning of the travelling device 20, so that the turning device 20 cannot be overturned. The travelling wheels are turnable in an unlimited angular range of 360°.

The travelling device 20 according to the present invention provides high speed in working the terrain, so that it can replace several workers working with usual mowers or hedge cutters. Therefore, a working efficiency is improved and a labour force is saved.

The travelling device 20 according to the present invention has also excellent self-extrication capability, because in a case of getting stuck it can be released easily by turning of the travelling wheels 2.

Utilization of the remote control can eliminate the fear feeling of the operator who can otherwise be afraid of possible fall or overturn, and particularly during the work on the slopes.

Furthermore, the operator using the remote control is not burdened with vibrations, so that can work for a long time without suffering from fatigue.

Low weight of the whole travelling device 20 enables also easily work on terrain areas accessible only with difficulty, such as e.g. waterlogged terrains, swamps, sandy surfaces, etc.

INDUSTRIAL APPLICABILITY

The travelling device particularly for self-propelled mower is applicable e.g for cutting or mowing of grassy or bushy areas, for maintenance the roadsides, railway tracks, riverbanks, etc., as well as for working all flat or slanted areas accessible with difficulty.

LIST OF REFERENCE SIGNS

1—frame
2—travelling wheel
3—motor unit
4—device 4 for travelling wheel 2 suspension
5—device 5 for travelling wheel 2 mounting
6—transmission disc 6 for travelling wheel 2 drive
7—transmission disc 7 for travelling wheel 2 turning
8—moving off device
9—endless transmission member 9 for travelling wheel 2 drive
10—steering servomotor 10 for travelling wheels 2 turning
11—driving roller
11a—auxiliary guide roller
12—endless transmission member 12 for travelling wheels 2 turning
13—driving shaft
14—transmission device
15—driving servomotor
20—travelling device
21—travelling unit
22—control unit
23—transmitter

The invention claimed is:

1. A travelling device (20) comprising a frame (1), flexibly suspended wheels (2) rotating on their vertical axes in an unlimited angular range of 360° as well as on their horizontal axes, a motor unit (3) with a drive shaft (13), a working device, first transmission discs (7) for travelling wheel (2) girded by a first transmission member (9) guided over a driving roller (11), characterized in that travelling wheel (2) drive is effected by means of second transmission discs (6) connected with each travelling wheel (2) by a transmission device (14), and wherein all second transmission discs (6) are connected with moving off device (8) on drive shaft (13) by means of a second transmission members (9).

2. Travelling device (20) according to claim 1, wherein each second transmission disc (6) for travelling wheel (2) drive is positioned horizontally and is turnable on its vertical axis.

3. Travelling device (20) according to claim 1, wherein each first transmission disc (7) for travelling wheel (2) turning is positioned horizontally and is turnable on its vertical axis.

4. Travelling device (20) according to claim 1, wherein said second transmission member (9) for travelling wheel (2) drive comprises an endless flexible member.

5. Travelling device (20) according to claim 1, wherein said first transmission member (12) for travelling wheel (2) turning comprises gears.

6. Travelling device (20) according to claim 1, wherein said second transmission member (9) for travelling wheel (2) drive comprises Cardan shafts.

7. Travelling device (20) according to claim 1, wherein a control unit (22) interconnected with driving servomotor (15) and steering servomotor (10) for travelling wheels (2) turning is further arranged on said frame (1).

8. Travelling device (20) according to claim 7, wherein said control unit (22) is remote-controlled.

9. Travelling device (20) according to claim 8, wherein said control unit (22) is remote-controlled by means of a transmitter (23) for transmitting radio signals or optical signals.

10. Travelling device (20) according to claim 1, wherein a seat and a control panel are arranged on said fame (1).

11. Travelling device (20) according to claim 1, wherein said travelling wheels (2) are particularly four.

* * * * *